UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE ETHER SOLVENT AND COMPOSITION.

1,425,173. Specification of Letters Patent. Patented Aug. 8, 1922.

No Drawing. Application filed January 21, 1921. Serial No. 438,989.

*To all whom it may concern:*

Be it known that I, STEWART J. CARROLL, a citizen of the United States of America, residing at Rochester, in the county of Monroe and State of New York, have invented certain new and useful Improvements in Cellulose Ether Solvents and Compositions, of which the following is a full, clear, and exact specification.

This invention relates to solvents for making strong solutions of cellulose ether and also relates to the cellulose ether compositions or dopes produced by the aid of such solvents. One object of my invention is to provide a solvent which will dissolve such large proportions of cellulose ethers that thick or suitably viscous flowable solutions may be obtained for use in plastic and film making arts. Another object of my invention is to provide a cellulose ether solution suitable for the manufacture of strong, flexible, transparent film by the methods and in the apparatus now in customary use.

In U. S. Patent No. 1,188,376, Lilienfeld, June 20, 1916, there are disclosed a series of alkyl ethers of cellulose, of which certain ones are practically insoluble in water. My invention is concerned chiefly with the ethers having this latter property. While such ethers form thin solutions in various single solvents, like ethyl alcohol, and while such single solutions are often useful for various purposes, it has been found that such solutions do not contain a sufficient proportion of the ethers to make the viscous flowable compositions or dopes which may be worked into photographic film base by the customary methods.

I have discovered that an adequately strong and useful solvent may be prepared by mixing ethyl acetate, ethyl alcohol and water. The addition of water to the combination causes a very noticeable increase in the solvent action and does not impair the transparency or strength of the final film when produced under the standard manufacturing conditions.

In the preferred embodiment of my invention I combine 90 parts of ethyl acetate and 7 parts of ethyl alcohol with 3 parts of water, the proportions being by weight. 400 to 800 parts of this solvent mixture will dissolve approximately 100 parts of ethyl cellulose, for example. The resulting dopes, when thoroughly mixed and filtered if desired, may be worked up into transparent, strong, flexible sheets or films. The relative proportions may be varied considerably. For instance, I may use 92 parts of ethyl acetate, 7 parts of ethyl alcohol and 1 part of water, or, on the other hand, I can, for example, combine 82 parts of ethyl acetate and 12 parts of ethyl alcohol with 6 parts of water. Other equivalent proportions will readily occur to those skilled in this art. Other substances which impart additional suppleness or incombustibility, or other desired qualities, to the finished film may be added to the dope, such modifying agents being, for instance, triphenyl phosphate, tricresyl phosphate, camphor and the like.

All of the ingredients are of the commercial type, sufficiently purified for the process of film manufacture, so as to give a homogenous dope yielding films of the proper transparency and relative freedom from color.

Having thus described my invention, what I claim as new and desire to secure by Letters Patent is:

1. A composition solvent for alkyl ethers of cellulose, comprising from 82 to 92 parts of ethyl acetate, 7 to 12 parts of ethyl alcohol and 1 to 6 parts of water by weight.

2. A composition solvent for ethyl ethers of cellulose which are substantially insoluble in water, comprising 90 parts of ethyl acetate, 7 parts of ethyl alcohol and 3 parts of water.

3. A viscous flowable film-forming composition, comprising an alkyl ether of cellulose dissolved in a mixture of ethyl acetate, ethyl alcohol and water.

4. A viscous flowable film-forming composition, comprising an alkyl ether of cellulose dissolved in a compound solvent comprising from 82 to 92 parts of ethyl acetate, 7 to 12 parts of ethyl alcohol and 1 to 6 parts of water by weight.

5. A composition of matter comprising 100 parts of an alkyl ether of cellulose and 400 to 800 parts of a compound solvent containing from 82 to 92 percent of ethyl acetate, 7 to 12 percent of ethyl alcohol and 1 to 6 percent of water by weight.

6. A viscous flowable film-forming composition, comprising ethyl cellulose dissolved in a compound solvent comprising approximately 90 parts by weight of ethyl acetate, 7 parts of ethyl alcohol and 3 parts water.

Signed at Rochester, New York, this 8th day of January, 1921.

STEWART J. CARROLL.